US008551219B2

(12) United States Patent
Johannessen et al.

(10) Patent No.: US 8,551,219 B2
(45) Date of Patent: Oct. 8, 2013

(54) METHOD FOR STORING AND DELIVERING AMMONIA FROM SOLID STORAGE MATERIALS USING A VACUUM PUMP

(75) Inventors: Tue Johannessen, Glostrup (DK); Ulrich Quaade, Bagsvaerd (DK)

(73) Assignee: Amminex Emissions Technology A/S, Soborg (DK)

( * ) Notice: Subject to any disclaimer, the term of this patent is extended or adjusted under 35 U.S.C. 154(b) by 142 days.

(21) Appl. No.: 13/257,195

(22) PCT Filed: Mar. 18, 2010

(86) PCT No.: PCT/EP2010/001707
§ 371 (c)(1),
(2), (4) Date: Nov. 8, 2011

(87) PCT Pub. No.: WO2010/105833
PCT Pub. Date: Sep. 23, 2010

(65) Prior Publication Data
US 2012/0045379 A1 Feb. 23, 2012

Related U.S. Application Data

(60) Provisional application No. 61/161,842, filed on Mar. 20, 2009.

(30) Foreign Application Priority Data

Mar. 18, 2009 (EP) .................................. 09003877

(51) Int. Cl.
*F17C 11/00* (2006.01)

(52) U.S. Cl.
USPC .................. 95/128; 206/0.7; 96/132; 423/352

(58) Field of Classification Search
USPC ................. 95/128; 206/0.7; 96/121, 131, 132; 423/352
See application file for complete search history.

(56) References Cited

U.S. PATENT DOCUMENTS

| 5,161,389 | A | 11/1992 | Rockenfeller et al. | |
| 6,261,345 | B1 * | 7/2001 | Miyano et al. | 95/96 |
| 8,088,201 | B2 * | 1/2012 | Johannessen | 96/108 |
| 8,449,857 | B2 * | 5/2013 | Johannessen et al. | 423/352 |
| 2005/0247050 | A1 * | 11/2005 | Kaboord et al. | 60/286 |

FOREIGN PATENT DOCUMENTS

| DE | 10 2007 022858 | 11/2008 |
| WO | WO 99/01205 | 1/1999 |
| WO | WO 2004/042207 | 5/2004 |
| WO | WO 2006/012903 | 2/2006 |
| WO | WO 2006/081824 | 8/2006 |
| WO | WO 2007/000170 | 1/2007 |
| WO | WO 2008/077652 | 7/2008 |

OTHER PUBLICATIONS

International Search Report dated Jun. 8, 2010 for Application No. PCT/EP2010/001707.
Written Opinion dated Jun. 8, 2010 for Application No. PCT/EP2010/001707.

* cited by examiner

*Primary Examiner* — Frank Lawrence, Jr.
(74) *Attorney, Agent, or Firm* — Frost Brown Todd LLC

(57) ABSTRACT

In a method of storing and releasing gaseous ammonia from solid storage materials a first solid storage material (14) capable of releasing ammonia by desorption in a first container (10) and a second solid storage material (24) capable of ad- or absorbing ammonia reversibly and having a higher affinity for ammonia than the first storage material (14) in a second container (20) smaller than said first container (10) are in fluid communication. The pressure in at least the first container (10) is kept below the equilibrium pressure between ammonia and the storage material contained therein by means of a pump (28). When the pressure in the first container (10) is below a pressure threshold where the first storage material (14) does not release an amount of ammonia required by an ammonia consuming device connected with the containers via the vacuum pump (28), the second storage material (24) is heated such that the ammonia pressure of the second material (24) is higher than the ammonia pressure of the first material (14). The ammonia released by the second material (24) is continuously pumped off so as to deliver sufficient ammonia to said ammonia consuming unit. A device for carrying out the method is also described.

17 Claims, 6 Drawing Sheets

METHOD FOR STORING AND DELIVERING AMMONIA FROM SOLID STORAGE MATERIALS USING A VACUUM PUMP

FIELD OF THE INVENTION

The invention relates to an improved method and device for storing and releasing gaseous ammonia from solid storage materials using a vacuum pump.

BACKGROUND OF THE INVENTION

Ammonia is a widely used chemical with many applications. One specific application is as reductant for selective catalytic reduction (SCR) of $NO_x$ in exhaust gas from combustion processes.

For most applications, and in particular in automotive applications, the storage of ammonia in the form of a pressurized liquid in a vessel is too hazardous. Urea is a safe, but an indirect and impractical method for mobile transport of ammonia since it requires to be transformed into ammonia by a process involving thermolysis and hydrolysis $((NH_2)_2CO + H_2O \rightarrow 2 NH_3 + CO_2)$.

A storage method involving ad- or absorption in a solid can circumvent the safety hazard of anhydrous liquid ammonia and the decomposition of a starting material.

Metal ammine salts are ammonia absorbing and desorbing materials, which can be used as solid storage media for ammonia (see, e.g. WO 2006/012903 A2), which in turn, as mentioned above, may be used as the reductant in selective catalytic reduction to reduce $NO_x$ emissions.

Usually, ammonia is released by thermal desorption, e.g. from metal ammine salts, by external heating of a storage container, see e.g. WO 1999/01205 A1. The heating elements may also be placed inside the storage container, see e.g. U.S. Pat. No. 5,161,389 and WO 2006/012903 A2.

In WO 2007/000170 A1 the release of ammonia from the storage material is facilitated by lowering the ammonia pressure in the gas phase.

WO 2008/077652 A2 and DE 10 2007 022 858 A1 disclose systems that use at least two storage materials having different vapor pressures in at least one operation mode.

The present invention seeks to improve the method of desorption of ammonia from an ammonia storage material using a vacuum pump.

SUMMARY OF THE INVENTION

The invention relates to a method of storing and releasing gaseous ammonia from solid storage materials wherein a first solid storage material capable of releasing ammonia by desorption in a first container and a second solid storage material capable of ad- or absorbing ammonia reversibly and having a higher affinity for ammonia than the first storage material in a second container, which is smaller than the first container, are in fluid communication. The pressure in at least the first container is kept below the equilibrium pressure between ammonia and the storage material contained therein by means of a vacuum pump. When the pressure in the first container is below a pressure level where the first storage material does not release an amount of ammonia required by an ammonia consuming device connected with the containers via the vacuum pump, the second storage material is heated such that the ammonia pressure of the second material is higher than the ammonia pressure of the first material, and the ammonia released by the second material is continuously pumped off so as to deliver sufficient ammonia to the ammonia consuming unit.

The invention is further directed to a device for storing and delivering ammonia to an ammonia consuming unit, the device comprising:
a first container containing a first solid storage material capable of releasing ammonia by desorption;
a second container which is in fluid communication with said first container and smaller than that first container containing a second solid storage material capable of ad- or absorbing ammonia reversibly and having a higher affinity for ammonia than the first storage material;
heating means for the second container;
optional heating means for the first container;
a vacuum pump in fluid communication with both containers which can lower the pressure thereof below the equilibrium pressure between ammonia and at least the first storage material;
a controller that activates the heating of the second storage material; and
a connection between the vacuum pump and the ammonia consuming unit.

DESCRIPTION OF EMBODIMENTS

Figure 1:
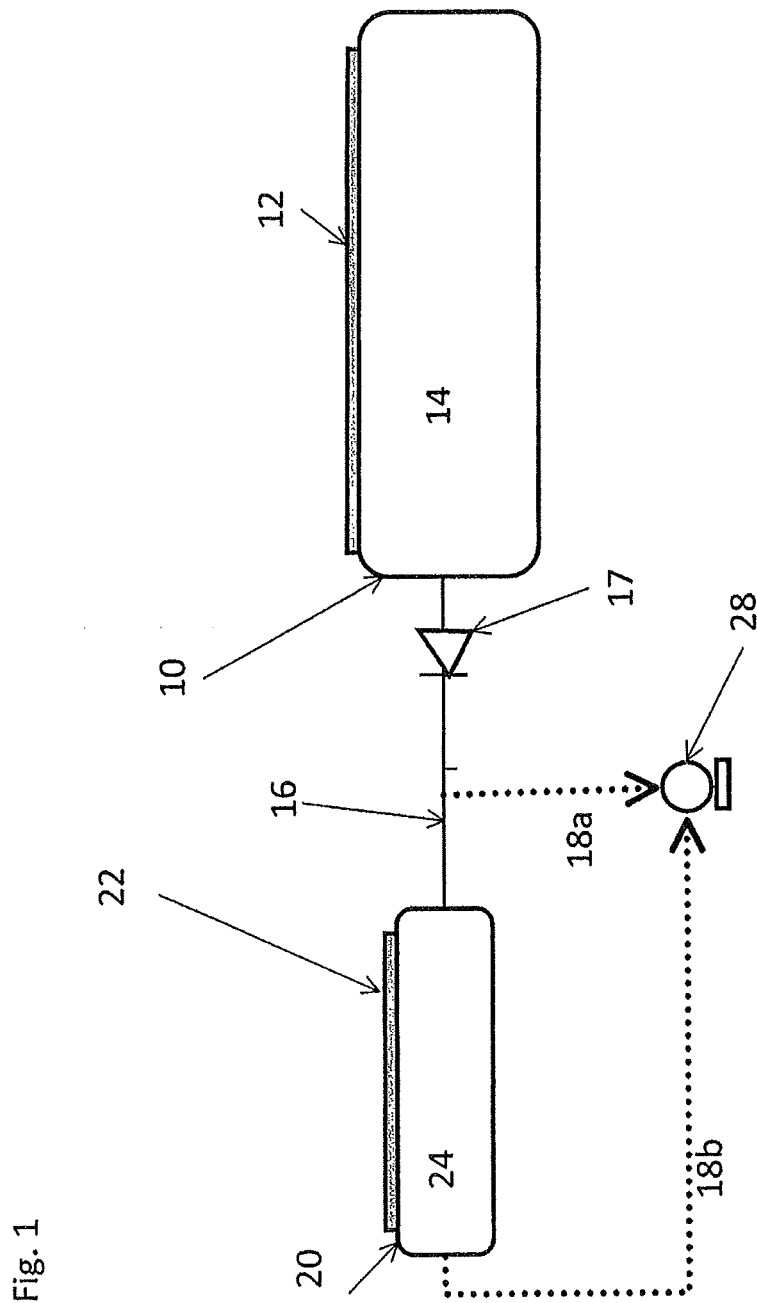
FIG. 1 schematically shows a first container with a first solid ammonia storage material, a second container with a second solid ammonia storage material, means for heating and a vacuum pump in a first embodiment of the device according to the invention. Optionally, a one-way valve is located in front of the first container.

Embodiments of the invention will now be described.

When solid storage and delivery systems are used for ammonia dosing for SCR in automotive applications, the temperature range for operation may be from $-40°$ C. to $80°$ C. Particularly the low temperature regime can limit the performance of a vacuum operated system both from a practical and a fundamental point of view: The equilibrium pressure of the storage materials decreases exponentially with temperature. For example a typical storage material like $Sr(NH_3)_8Cl_2$ has an equilibrium pressure of about 0.5 bar at room temperature and 0.1 bar at $0°$ C. To facilitate vacuum-assisted desorption, a pump is needed that can operate effectively at pressures well below the equilibrium pressure, i.e. 0.05 bar at 0° C. and even lower at lower temperatures.

The cost and power requirement of the pump is directly linked to the ability to perform at the lowest pressure. From the fundamental point of view the desorption process is an activated process. The kinetics is in the simplest approximation governed by an Arrhenius expression $\mathrm{Exp}(-E_a/kT)$, where $E_a$ is the desorption energy, k is Boltzmann's constant and T is the temperature. This means that the desorption process is slowed down exponentially when the temperature is lowered. This will limit the desorption ability at low temperatures.

On long time scales a single storage material can be heated to a temperature where both kinetics is sufficiently fast and the pressure is sufficiently high for the pump to deliver useful amounts of ammonia. However, for practical system sizes (a passenger car may need at least 8-10 kg storage material to operate for e.g. 30,000 km), with realistic power limitations for heating, e.g. 200-400 W, the heating time to reach an appropriate pressure level suitable for operation of the pump will be unacceptably long.

By the present invention vacuum-operated systems are improved to assure acceptable start up times at very low temperatures.

In one embodiment at least one first or main container is filled with a first storage material having ammonia ad- and/or absorbed therein. A second or further container, also referred to as "booster", is filled with a second, ammonia ad- and/or absorbing and desorbing material. The second material has a higher affinity for ammonia than the first material. Both containers are in fluid communication with each other, and at least the booster can be heated. Usually, the booster will be significantly smaller that the main container and have a significantly faster thermal response upon heating. A vacuum pump is connected. Above a certain temperature level sufficient amounts of ammonia can be withdrawn directly from the main container, and the booster is passive. At lower temperatures where the pump cannot withdraw enough ammonia from the main container to deliver the amounts of ammonia required by an ammonia consuming unit, the booster and optionally the main container are heated. A controller activates the heating of the second and optionally the first storage material. Upon heating, stored ammonia is activated in the booster and the pump withdraws ammonia from the booster without significantly raising the pressure in the main tank. The immediate withdrawal of ammonia activated in the booster is advantageous, since it otherwise would allow for a significant increase in the pressure level in the main tank and thereby re-adsorb or -absorb in depleted areas of the main tank. Later, when the pressure level of the main container has increased to a level where the pump can withdraw the required ammonia flow from the main container alone, heating of the booster is stopped. As the temperature of the booster decreases it reaches a point where the equilibrium pressure of the booster is below that of the main container. At that point re-saturation of the booster begins—it may even occur when the pump is running. Re-saturation will continue until the booster is fully saturated or the booster is heated to an equilibrium pressure above the system pressure. If the vacuum pump under certain low-temperature conditions cannot pump to a pressure below the equilibrium pressure of the first material, an optional one-way valve can be inserted to prevent partial re-absorption in the main container.

At low temperatures the system pressure will be below ambient pressure. In any practical system there will be a non-vanishing leak rate of air into the system. If the system in an extreme case is filled with air up to one bar total pressure, the ammonia transport from the main container to the booster changes from a mass flow to a diffusion of ammonia in air. The diffusion transport is proportional to the area and inversely proportional to diffusion distance. If the main container and the booster are connected by a tube of some (small) diameter and (significant) length the diffusion transport will be extremely slow, essentially preventing any re-saturation.

Accordingly, the diffusion area, A, is preferably maximized and the diffusion length, l, minimized. This gives a system, where re-saturation can be assured even in the case of slow leaking of air into the system. Preferably $(A)/(l) \geq 0.1$ cm.

Heating of the containers may be achieved by various means: Both containers can be heated internally or externally with contact heating or non-contact heating. For example a electric resistance heating element can be placed inside the container thereby delivering heat to the storage material. Alternatively, waste heat in the form of hot coolant or hot gas can pass through a heating element placed inside the storage material. If electric heating or waste heat is not available, burning of some fuel may supply the heat. If non-contact heating is desired this can be accomplished by e.g. infrared radiation onto the container, induction heating or microwave heating of either the surface of the container or material inside the container. In the case of induction heating of the material inside the container, the material could be mixed with a ferromagnetic material to make the energy transfer more efficient.

All combinations of heating of the first and second containers may be used. However, for SCR in automotive applications where waste heat is only available some time after engine start, heating of the second container has to be electric (electric resistance, electric induction, microwave, infrared) or by burning fuel.

Two specific heating combinations are particularly mentioned: 1. Internal electric resistance heating of both containers and 2. electrical resistance heating of the second container combined with heating of the first container using waste heat from the coolant either internally or externally.

In one embodiment the booster container is integrated onto or into the main container. In this way the diffusion area, A, can be maximized and the diffusion length, l, minimized. This gives a system, where re-saturation can be assured even in the case of slow leaking of air into the system.

Another benefit of this embodiment is that the heat supplied to the booster will later migrate to the main unit instead of being dissipated to the surroundings.

Even further, movement of ammonia from the first material to the second material consists of an endothermic desorption from the first material and an exothermic absorption in the second material. This means that the second material will heat up and the first material will cool down. This will slow down the process, however, since the first material is surrounding the second material, the heat generated in the second material efficiently migrates to the first material thereby keeping the re-saturation speed at a maximum. Since the second material has a higher ammonia affinity than the first material, the total process is exothermic.

In one embodiment the heating element and the geometry of a booster integrated in the main container is chosen such that the single heating element heats both materials. Preferably, the second material should be heated first.

In another embodiment, the booster is heated using an external heat source. The heat source could for example be (but is not limited to) an electric resistance heater, or waste heat from the engine or exhaust system. In one variation the heat source is radiant, such as infrared heating, microwave heating or induction heating. This has the advantage that an intimate thermal contact between the container and the heating element is unnecessary.

The vacuum pump is connected with an ammonia consuming unit, usually via a valve. A buffer may be placed between the pump and the ammonia consuming unit.

The ammonia consuming unit may, e.g., be a fuel cell working with ammonia or a catalyst splitting ammonia into nitrogen and hydrogen or preferably a catalyst for selective catalytic reduction of $NO_x$ in exhaust gases from combustion processes, such as exhaust gases from a combustion engine in a motor vehicle, using ammonia as a reductant.

The first solid storage material capable of releasing ammonia by desorption is a material in which ammonia is adsorbed or absorbed. Materials that may contain adsorbed ammonia are e.g. acidic carbon or certain zeolites. Materials in which ammonia is absorbed are, e.g., metal ammine salts. These materials can absorb ammonia reversibly, i.e. after the desorption of the ammonia contained therein, they can re-absorb ammonia. The second solid storage material is one which reversibly desorbs and ad- or absorbs ammonia, e.g., acidic carbon or a metal ammine salt.

Preferred metal ammine salts in the present invention have the general formula: $M_a(NH_3)_nX_z$, wherein M is one or more cations selected from alkali metals such as Li, Na, K or Cs, alkaline earth metals such as Mg, Ca, Ba or Sr, and/or transition metals such as V, Cr, Mn, Fe, Co, Ni, Cu, or Zn or combinations thereof such as NaAl, KAl, $K_2Zn$, CsCu, or $K_2Fe$, X is one or more anions selected from fluoride, chloride, bromide, iodide, nitrate, thiocyanate, sulphate, molybdate, and phosphate ions, a is the number of cations per salt molecule, z is the number of anions per salt molecule, and n is the coordination number of 2 to 12.

More preferably, the first storage material is $CaCl_2$, $SrCl_2$, $BaCl_2$ or mixtures thereof and the second storage material is $MgCl_2$, $FeCl_2$, $NiCl_2$ or mixtures thereof or mixtures of one or more of the latter with the first storage material.

It is particularly preferred that the first storage material is $SrCl_2$ and the second storage material is $MgCl_2$.

The achievements of the invention are among others
  a minimum time to dosing sufficient ammonia even at very low temperatures,
  a minimum power requirement even at very low temperatures, and
  an efficient re-saturation of the booster unit during any driving pattern, when the system is used in automotive applications, even at very low temperatures.

Turning now to FIG. 1, first or main container 10 filled with first material 14 is connected in fluid contact 16, optionally via one-way valve 17, with smaller container (booster) 20 containing second material 24. Means for heating 22 is shown for the booster 20 and optional means for heating 12 is shown for the main container 10. Two possible, alternative connection lines shown as dotted lines 18a, 18b lead to vacuum pump 28. The process requiring $NH_3$ from the system (e.g SCR) is not shown, but is located downstream of the pump.

Figure 2:
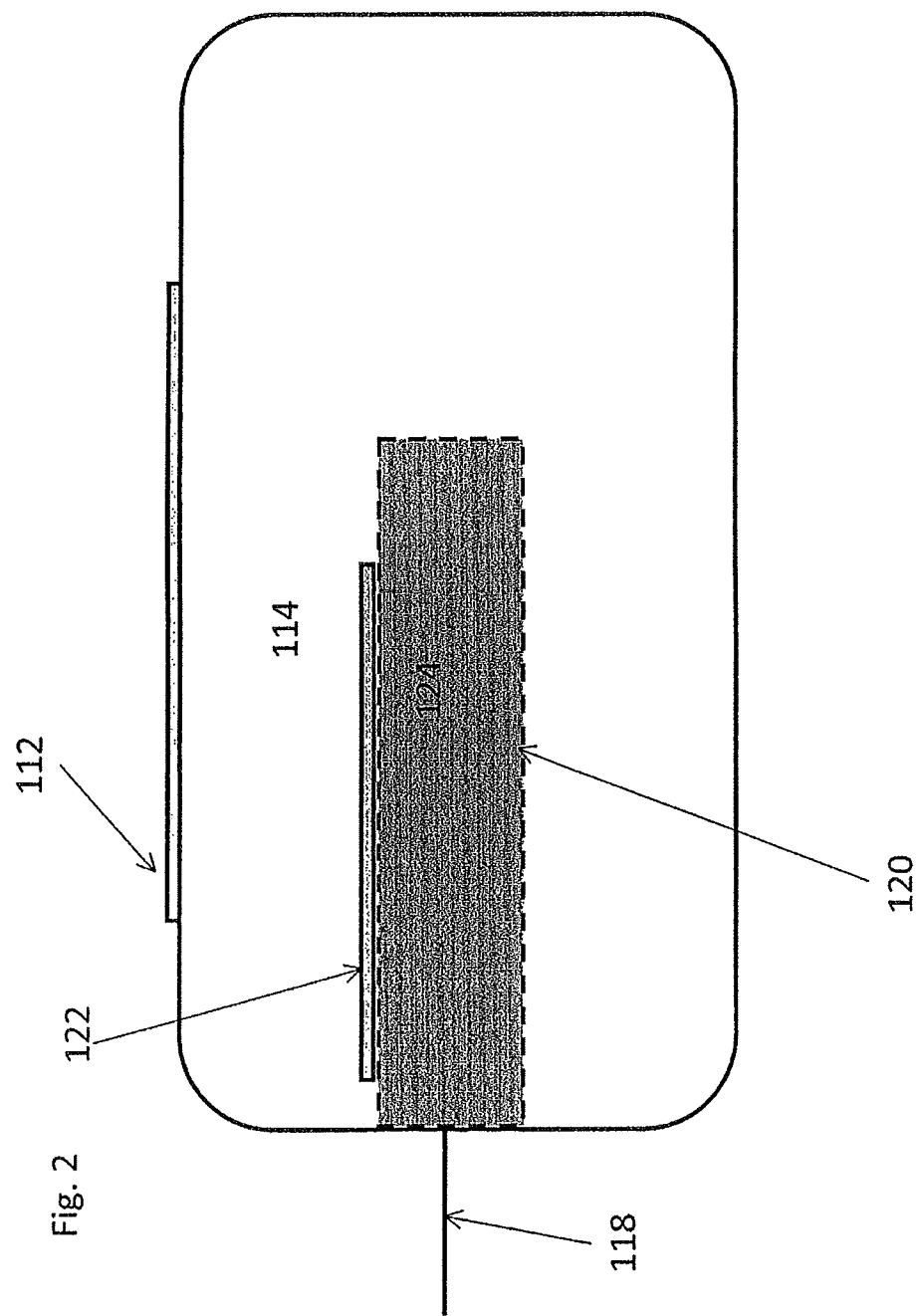
FIG. 2 schematically shows a first container with a first solid ammonia storage material, a second container with a second solid ammonia storage material and means for heating in a second embodiment of the device according to the invention.

FIG. 2 shows booster 120 having perforated walls which is integrated into the main container 110. Two different means 112, 122 for heating first material 114 and second material 124 are shown. The heating means 112 for the first material 114 is optional. Line 118 leads to a vacuum pump (not shown).

Figure 3:
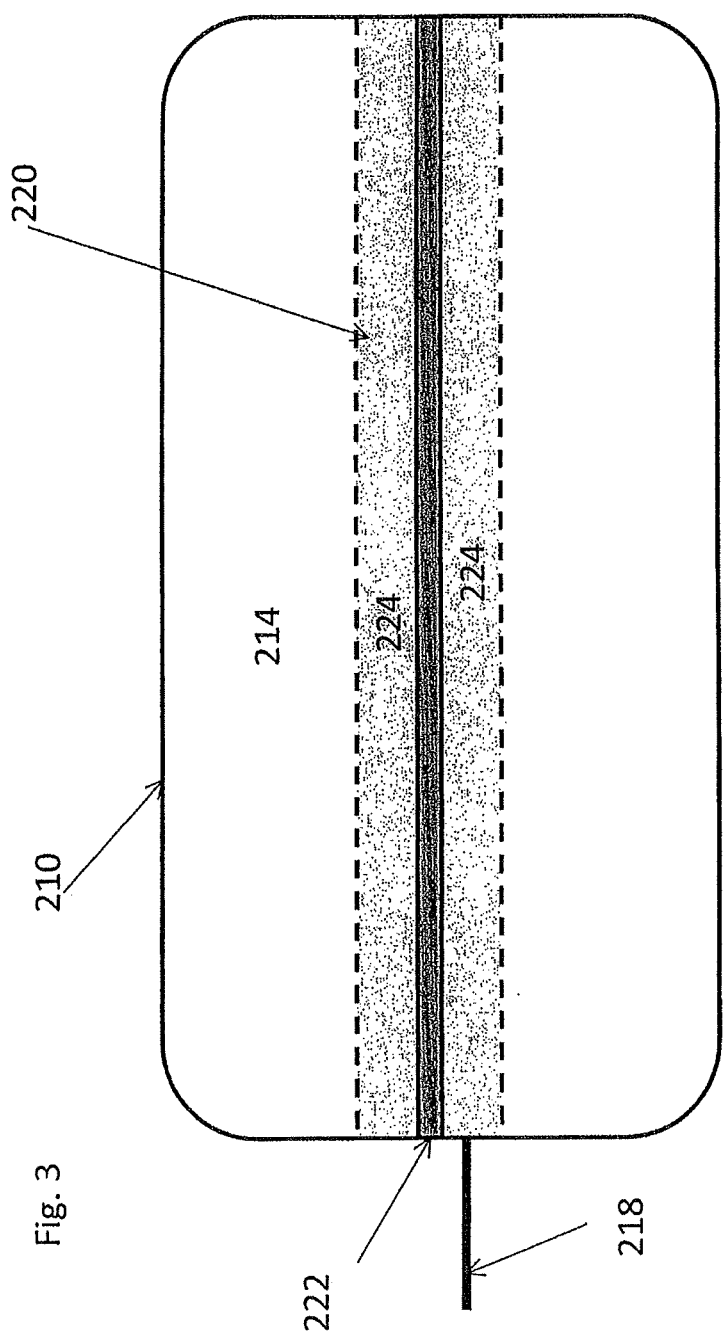
FIG. 3 schematically shows a first container with a first solid ammonia storage material, a second container with a second solid ammonia storage material and means for heating in a third embodiment of a device according to the invention.

FIG. 3 shows an example of a geometry where a single heating element 222 can heat both second material 224 contained in booster 220 having perforated walls and first material 214 in main container 210. Line 218 leads to the vacuum pump (not shown).

Figure 4:
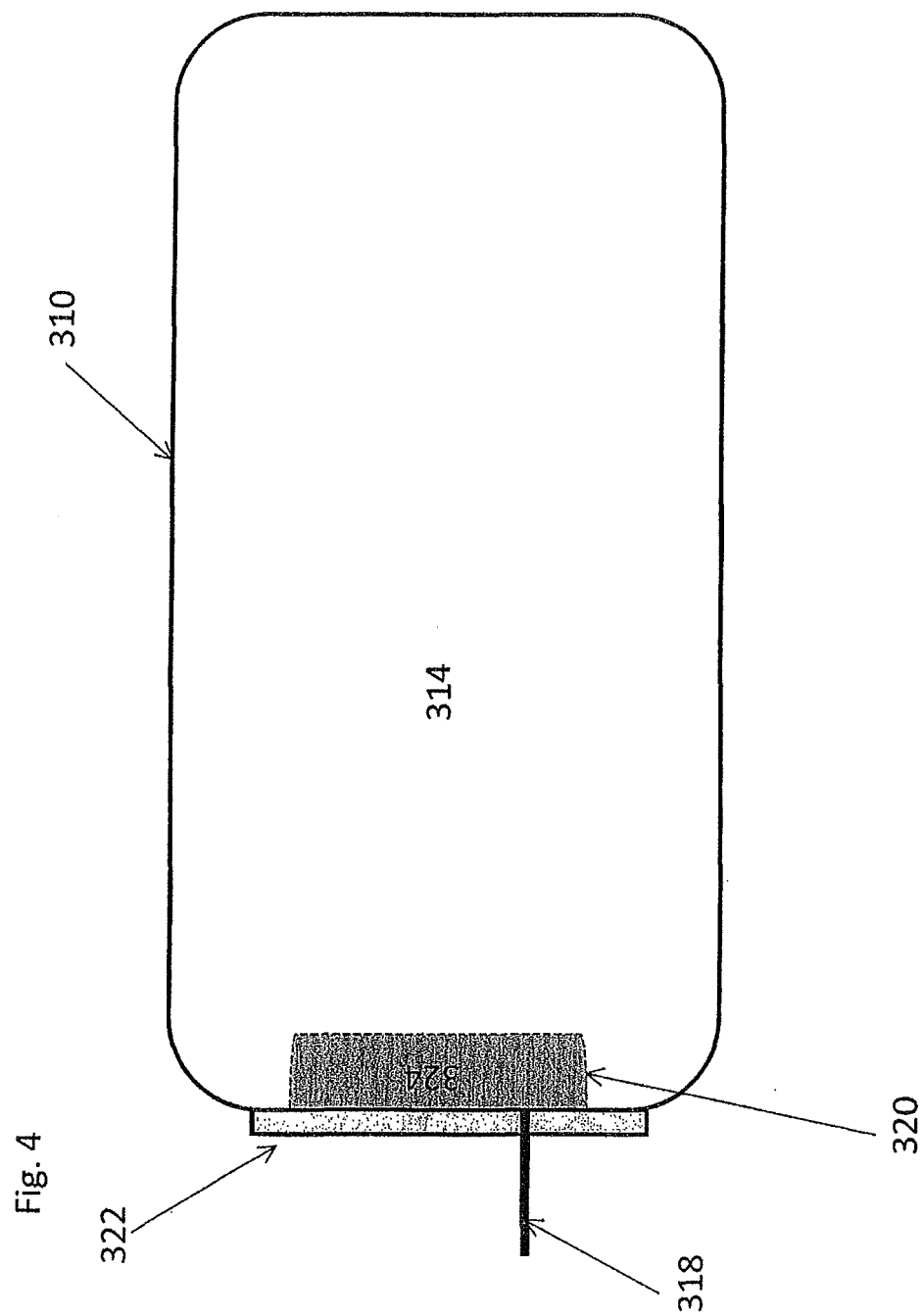
FIG. 4 schematically shows a first container with a first solid ammonia storage material, a second container with a second solid ammonia storage material and means for heating in a fourth embodiment of the device according to the invention.

FIG. 4 shows an example of external heating 322 of booster 320 having perforated walls and containing second material 324 which is integrated in main container 310 containing first material 314. Line 318 leads to a vacuum pump (not shown).

Figure 5:
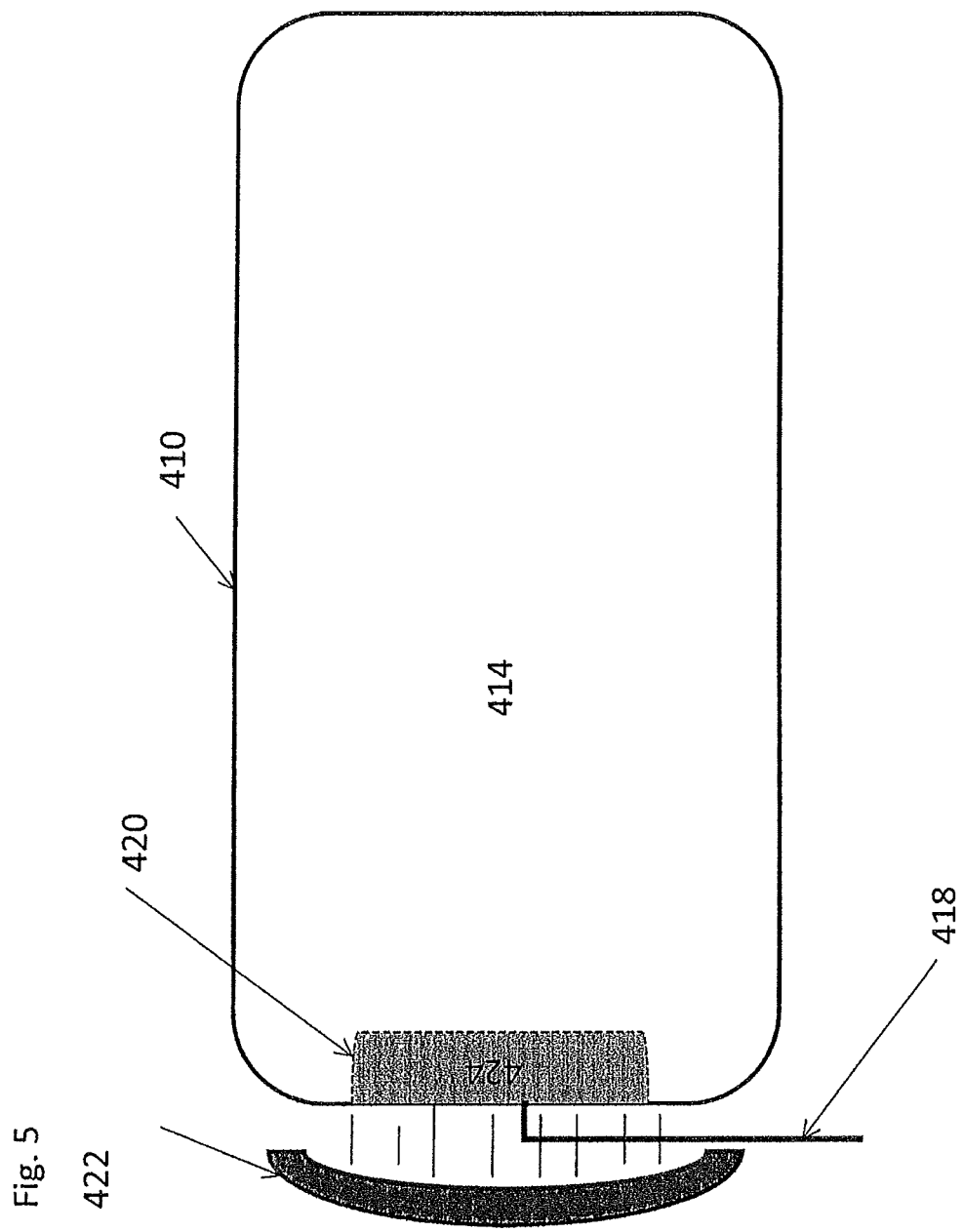
FIG. 5 schematically shows a first container with a first solid ammonia storage material, a second container with a second solid ammonia storage material and means for heating in a fifth embodiment of the device according to the invention.

FIG. 5 shows an example of external radiant heating 422 of booster 420 having perforated walls and containing second material 424 which is integrated in main container 410 containing first material 414. Line 418 leads to a vacuum pump (not shown).

Figure 6:
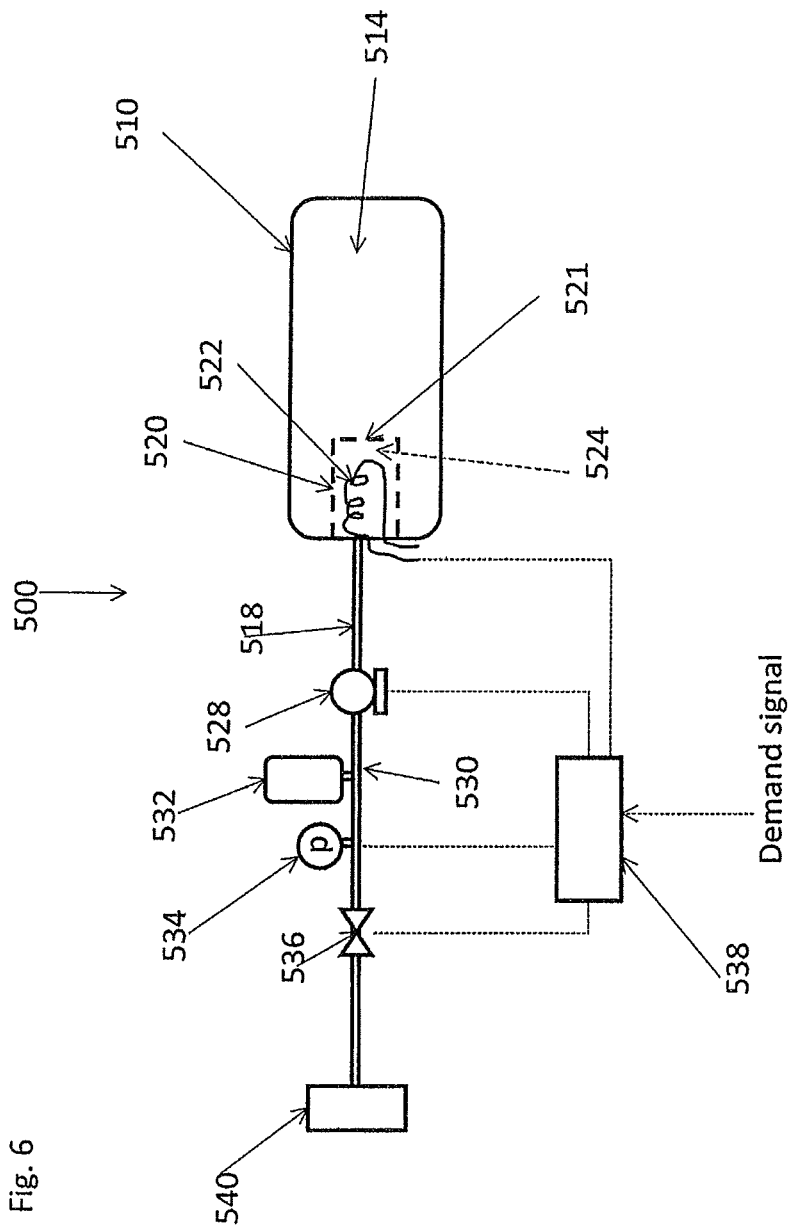
FIG. 6 schematically shows the device according to the invention connected to an ammonia consuming unit.

FIG. 6 shows an example of a device 500 for storing and controlled release of gaseous ammonia from a solid storage medium. The device 500 comprises
  a first container 510 containing a first solid storage material 514 capable of releasing ammonia by desorption;
  a second container (booster) 520 which is built into the first container 510 in fluid communication with the first container 510 through a perforated wall 521 and smaller than that first container 510 containing a second solid storage material 524 capable of ad- or absorbing ammonia reversibly and having a higher affinity for ammonia than the first storage material;
  heating means 522 for the second container 520;
  a vacuum pump 528 in fluid communication with both containers through line 518 and perforated wall 521, which can lower the pressure thereof below the equilibrium pressure between ammonia and at least the first storage material 521;
  a connection 530 between the vacuum pump 528 and the ammonia consuming unit 540, optionally comprising a valve 536, and
  an active or passive controller 538 that activates the heating of the second storage material 524, usually in response to a demand signal;
  optional pressure sensing 534, and
  optional buffer volume 532.

EXAMPLES

Example 1

In an experiment similar to FIG. 1 with a booster containing 100 g of $MgCl_2$ and a main container filled with 5 kg of saturated $Sr(NH_3)_8Cl_2$, resaturation of the booster was investigated. At room temperature the system pressure was 0.4 bar (absolute). Re-saturation rates (of ammonia absorbing in the depleted $MgCl_2$) between 2-4 g/hour were measured. At 5° C. the re-saturation rate drops to about 1 g/hour.

Example 2

A system similar to FIG. 2 was investigated comprising saturated $MgCl_2$ (i.e. $Mg(NH_3)_6Cl_2$) in the booster and a main container filled with 5 kg of saturated $Sr(NH_3)_8Cl_2$. The heating element of the booster has a power of 240 W. Ammonia was pumped from the system with a vacuum pump. Before the experiment was started, the system was in equilibrium at a certain temperature. When the experiment was initiated the pump and booster heating element was switched on and the ammonia flow from the pump was measured. The time-to-dose is the time measured until the ammonia flow exceeds 0.2 g/min via the pump. At system temperatures above 10° C. the time-to-dose was essentially zero, since the main container can immediately deliver more than 0.2 g/min. At lower temperature the time-to-dose gradually increased until 4 minutes at −25° C. When the pump is not modified, the time-to-dose from the booster-enhanced system is mainly determined by a combination of the mass of material in the booster and the power of the heating element. A low mass of material and high power of the heater gives a rapid activation of the storage mass in the booster, and the pressure level in the booster enables the pump to withdraw sufficient ammonia flow after a short heating time.

All cited patents, patent applications and journal articles referred to in this specification are hereby incorporated by reference.

The invention claimed is:

1. A method of storing and releasing gaseous ammonia from solid storage materials wherein a first solid storage material capable of releasing ammonia by desorption in a first container and a second solid storage material capable of ad- or absorbing ammonia reversibly and having a higher affinity for ammonia than the first storage material in a second container smaller than said first container are in fluid communication, and wherein the pressure in at least the first container is kept below the equilibrium pressure between ammonia and the storage material contained therein by means of a vacuum pump, further comprising the steps of, when the pressure in the first container is below a pressure level where the first storage material does not release an amount of ammonia required by an ammonia consuming device connected with the containers via the vacuum pump, the second storage material is heated such that the ammonia pressure of the second material is higher than the ammonia pressure of the first material, and the ammonia released by the second material is continuously pumped off so as to deliver sufficient ammonia to said ammonia consuming unit.

2. The method according to claim 1, wherein the first and second storage materials are in close contact such that the contact area A and the distance l between said first and second storage materials satisfies $(A)/(l) \geq 0.1$ cm.

3. The method according to claim 1, wherein waste heat from heating the second storage material is used to heat the first material.

4. The method according to claim 1, wherein the heating of the second storage material is done internally.

5. The method to claim 1, wherein the heating of the second storage material is done externally, including by non-contact heating.

6. The method according to claim 1 wherein the first material is heated.

7. The method according to claim 1, wherein the fluid communication between first and the second container is interrupted by a one-way valve, when the second material is heated.

8. The method according to claim 1, wherein the ammonia storage materials are salts of the general formula: $M_a(NH_3)_n X_z$, wherein M is one or more cations selected from alkali metals, alkaline earth metals, transition metals and combinations thereof, X is one or more anions selected from fluoride, chloride, bromide, iodide, nitrate, thiocyanate, sulphate, molybdate, and phosphate ions, a is the number of cations per salt molecule, z is the number of anions per salt molecule, and n is the coordination number of 2 to 12.

9. The method according to claim 8, wherein the first storage material is $CaCl_2$, $SrCl_2$, $BaCl_2$ or mixtures thereof and the second storage material is $MgCl_2$, $FeCl_2$, $NiCl_2$ or mixtures thereof with the first storage material.

10. The method according to claim 1 wherein the first storage material is $CaCl_2$, $SrCl_2$, $BaCl_2$ or mixtures thereof and a second storage material is material is $MgCl_2$, $FeCl_2$, $NiCl_2$ or mixtures thereof or mixtures thereof with the first storage material.

11. The method according to claim 10, wherein the first storage material is $SrCl_2$ and the second storage material is $MgCl_2$.

12. A device for storing and delivering ammonia to an ammonia consuming unit, said device comprising:
a first container containing a first solid storage material capable of releasing ammonia by desorption;
a second container which is in fluid communication with said first container and smaller than that first container containing a second solid storage material capable of ad- and/or absorbing ammonia reversibly and having a higher affinity for ammonia than the first storage material;
means for heating the second container;
optional means for heating the first container;
a vacuum pump in fluid communication with both containers which can lower the pressure thereof below the equilibrium pressure between ammonia and at least the first storage material;
a connection between the vacuum pump and the ammonia consuming unit, optionally comprising a valve, and
a controller that activates the heating of the second storage material.

13. The device according to claim 12, wherein the second container is integrated into the first container.

14. The device according to claim 12, further comprising a one-way valve between the first and the second container.

15. The device according to claim 14, further comprising a buffer downstream of the vacuum pump.

16. The method according to claim 1, wherein the ammonia consuming device is a catalyst for selective catalytic reduction of $NO_x$ in exhaust gases from combustion processes using the ammonia as a reductant and the first and second ammonia storage materials are salts of the general formula: $M_a(NH_3)_n X_z$, wherein M is one or more cations selected from the group consisting of alkali metals, alkaline earth metals, transition metals and combinations thereof, X is one or more anions selected from the group consisting of fluoride, chloride, bromide, iodide, nitrate, thiocyanate, sulphate, molybdate, and phosphate ions, a is the number of cations per salt molecule, z is the number of anions per salt molecule, and n is the coordination number of 2 to 12.

17. The device according to claim 13, wherein there the ammonia consuming unit is a catalyst for selective catalytic reduction of $NO_x$ in exhaust gases from combustion processes using the ammonia as a reductant and the first and second ammonia storage materials are salts of the general formula: $M_a(NH_3)_n X_z$, wherein M is one or more cations selected from the group consisting of alkali metals, alkaline earth metals, transition metals and combinations thereof, X is one or more anions selected from the group consisting of fluoride, chloride, bromide, iodide, nitrate, thiocyanate, sulphate, molybdate, and phosphate ions, a is the number of cations per sale molecule, z is the number of anions per salt molecule, and n is the coordination number of 2 to 12.

* * * * *